Aug. 22, 1933.  J. G. BERGDOLL  1,923,810
EXPANSION VALVE
Filed March 14, 1932
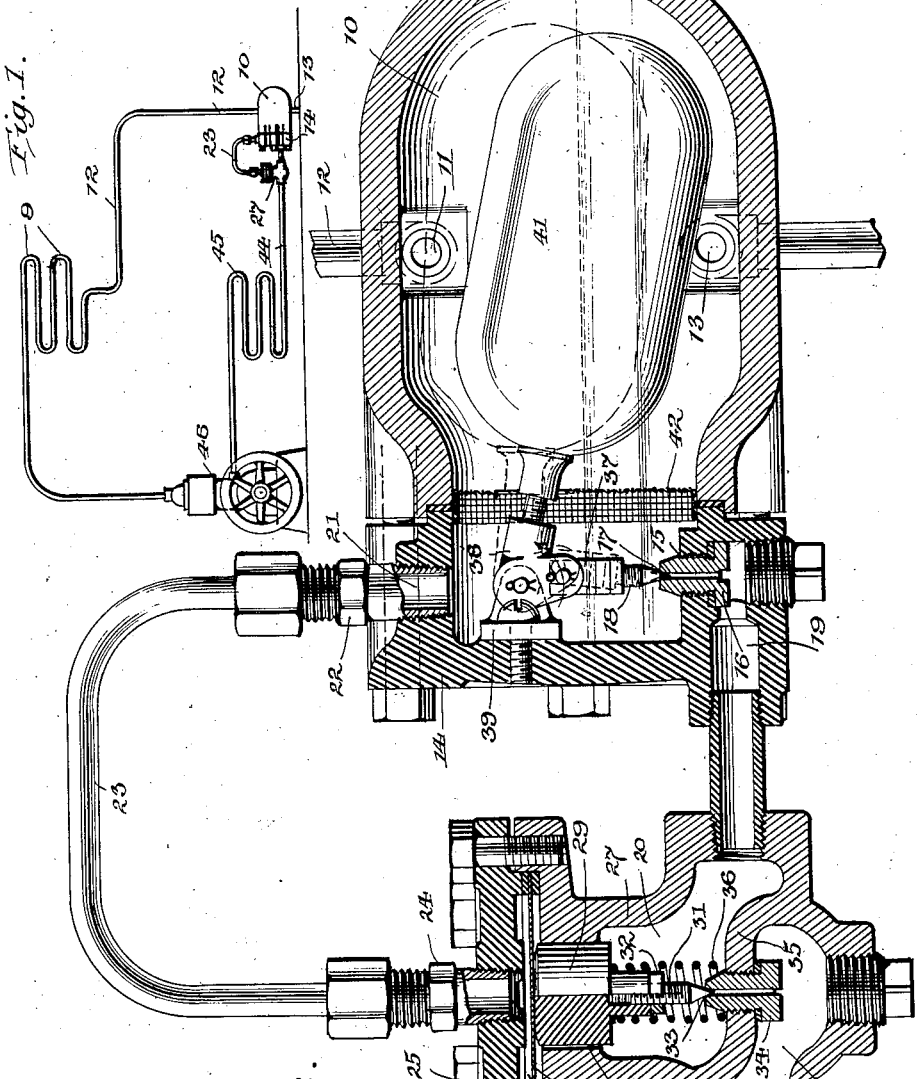
Inventor
John G. Bergdoll
By
Attorneys.

Patented Aug. 22, 1933

1,923,810

UNITED STATES PATENT OFFICE 1,923,810

EXPANSION VALVE

John G. Bergdoll, York, Pa., assignor to York Ice Machinery Corporation, York, Pa., a Corporation of Delaware Application March 14, 1932. Serial No. 598,840

9 Claims. (Cl. 62—8)

The present invention pertains to expansion valves for refrigeration systems, and more particularly to serially connected valves arranged to provide stage reduction of pressure between a liquid receiver and an evaporator.

It is recognized that in the usual type of high pressure float valve there is erosion and consequent leakage resulting from high velocities of expanding gas at the valve seat. This is due to the relatively large difference in pressures in the receiver or condenser and the evaporator. Efforts have been made to reduce erosion by expanding the liquid in stages, the drop in pressure at each stage of expansion being considerably less than when the expansion is effected in a single valve, but these proposed devices do not take into account varying condenser pressures and, consequently, have a varying differential at the float valve needle.

In the present arrangement of valves a fixed pressure drop is maintained across the float valve needle, a second valve being subjected to condenser pressure and prevented from opening until a predetermined difference between condenser pressure and the pressure of the fluid expanding at the float valve has been attained. In this way the erosion of the float valve seat is minimized.

The invention will be understood from the following description and the appended drawing, illustrating a preferred form of the invention, in which:—

Fig. 1 is a diagrammatic illustration of a circuit including the serially arranged valves employed in the inventon.

Fig. 2 is an enlarged sectional elevation of the valves and their connections.

In the drawing, liquid refrigerant is admitted to float chamber 10 through inlet 11 connected to condenser 9 by pipe 12. The float chamber is also provided with a normally closed outlet 13 which is used, on occasion, to drain the float chamber. Head 14 is bolted to the float chamber and is provided with a threaded opening 15 into which a ported threaded bushing 16 is screwed. The bushing has a valve seat 17 for needle valve 18, the seat being at the inlet end of the port and controlling flow therethrough. Head 14 is also provided with a discharge passage 19 for expanded refrigerant leading from the space below the ported bushing 16. Port 21 is threaded for reception of coupling 22 to which one end of pipe 23 is connected, the other end of the pipe being connected to coupling 24 threaded into cover plate 25 of diaphragm chamber 26.

Discharge passage 19 communicates with valve housing 27. Interposed between the interior of housing 27 and cover plate 25 is a movable abutment here shown as a flexible diaphragm 28 in thrust relation with valve carrier 29. The carrier 29 is guided to reciprocate axially in housing 27. Adjustably threaded to the carrier 29 is a valve stem 31, which is fixed in adjusted positions by means of a lock nut 32. Valve steam 31 terminates in a cone valve which cooperates with valve seat 33 in the apertured threaded bushing 34, the latter being mounted in a partition wall 35 dividing the space within the valve housing 27 into an inlet chamber 20 and a discharge chamber 30. Interposed between carrier 29 and partition 35 is a biasing spring 36 normally tending to unseat valve 31. The spring loaded diaphragm having opposed pressures acting on the two sides thereof has been shown for illustrative purposes, but it is obvious that any well known type of biased abutment subjected on one side to condenser pressure and on the other to the pressure at the low side of the float may be substituted for the diaphragm and spring herein described.

Valve 18 is opened and closed in accordance with the height of liquid in float chamber 10. The valve stem is adjustably threaded into yoke 37 which in turn is pivoted to bell crank 38. The bell crank is pivoted to a bracket 39 and carries float 41. Screen 42 is clamped between head 14 and chamber 10 and is provided with a suitable opening within which the float supporting arm works.

In the operation of the device, liquid refrigerant from condenser 9 is admitted to outlet passage 19 when the float rises and lifts valve 17 from its seat. Liquid so admitted to passage 19 and chamber 20 in valve housing 27 expands and its pressure acting upward on diaphragm 28, added to the force of spring 36, tends to open valve 31. Since connecting pipe 23 admits condenser pressure against the upper side of diaphragm 28, and since this pressure is greater than the force exerted by spring 36, valve 31 is held closed until sufficient pressure has been built up in the valve housing to overcome, with the assistance of the spring, the condenser pressure acting on the upper side of the diaphragm. A constricted passage 43 between guide 29 and the housing allows the pressure of the expanding refrigerant in chamber 20 to act on the under side of the diaphragm and steadies the action by throttling flow of the expanded refrigerant thereto.

When valve 31 is unseated, refrigerant in the valve housing is further expanded into chamber 30 and passes through pipe 44 to the evaporator 45 or low side of the system, after which it is returned to compressor 46.

The force of spring 36 is usually fixed to open valve 31 when there is a pressure differential between the condenser and valve housing of twenty to thirty pounds per square inch. Obviously, this pressure drop across valve seat 17 is maintained constant, regardless of fluctuations in condenser and evaporator pressures, since valve 31 opens only when this pressure differential is attained, and closes as soon as it is exceeded. The pressure drop from float chamber 10 to valve housing 27 is, therefore, never so great as to cause serious erosion of valve seat 17. At the same time, the pressure drop across valve seat 33 is substantially less than it would be were there direct expansion from the condenser to the evaporator, and erosion at this point is reduced to a minimum.

The invention has been described with reference to the particular embodiment shown in the drawing. It is intended, however, that other forms thereof be included in the definitions of the invention as embodied in the following claims.

What is claimed is:—

1. The combination in a refrigeration system having a condenser and evaporator therein, of a receiver for liquid refrigerant; a float valve for controlling flow of the refrigerant from the receiver; a second valve interposed between the float valve and the evaporator; and means responsive to a predetermined pressure drop across the float valve for controlling said second valve.

2. The combination in a refrigeration system having a condenser and evaporator therein, of a receiver for liquid refrigerant connected with the condenser; a float valve for controlling flow of refrigerant from the receiver; a second valve interposed between the float valve and the evaporator; means responsive in one direction to condenser pressure and in the opposite direction to refrigerant expanded through the float valve, said means being adapted to close the second valve; and means acting in conjunction with said expanded refrigerant to open the second valve against condenser pressure.

3. The combination in a refrigeration system having a condenser and evaporator therein, of a receiver for liquid refrigerant connected with the condenser; a float valve for controlling flow of refrigerant from the receiver; a second valve interposed between the float valve and the evaporator; a movable abutment having one side thereof subjected to condenser pressure and its opposite side to the pressure of refrigerant expanded through said float valve, said abutment being adapted to close said second valve; and biasing means acting in conjunction with said expanded refrigerant to open the second valve against condenser pressure.

4. The combination in a refrigeration system having a condenser and evaporator therein, of a receiver for liquid refrigerant connected with the condenser; a float valve for controlling flow of refrigerant from the receiver; a second valve interposed between the float valve and the evaporator; a diaphragm chamber having a diaphragm therein, said chamber being open on one side of the diaphragm to the receiver and on the other side of the diaphragm to the pressure on the discharge side of the float valve; and biasing means opposing the receiver pressure and acting in conjunction with the pressure on said discharge side to open said second valve.

5. The method of expanding refrigerant in a plurality of stages, which comprises varying the expansion ratio in the last stage to maintain a substantially constant ratio in a prior stage.

6. The method of expanding liquid refrigerant from a liquid receiver to a point of use at lower pressure, which comprises regulating flow by two adjustable orifices arranged in series; adjusting one of said orifices in response to the pressure drop through the other, and adjusting that other in response to liquid level in the receiver.

7. The method of expanding liquid refrigerant from a liquid receiver to a point of use at lower pressure, which comprises regulating flow by two adjustable orifices arranged in series; adjusting the first of said orifices in response to liquid level in the receiver, and adjusting the second of said orifices in response to the pressure drop through the first orifice.

8. The method of expanding liquid refrigerant from a liquid receiver to a point of use at lower pressure, which comprises regulating flow by means of two adjustable orifices arranged in series; increasing and diminishing the first orifice in response to the rise and the fall of liquid level in the receiver; and diminishing and increasing the second orifice in response to the rise and fall of the pressure differential between the receiver and a point in the flow path between said orifices.

9. The method of limiting the pressure drop through a float controlled expansion valve, which consists in variably throttling the off-flow from said valve in response to the pressure drop through the float valve.

JOHN G. BERGDOLL.